US006785223B1

(12) United States Patent
Korpi et al.

(10) Patent No.: US 6,785,223 B1
(45) Date of Patent: Aug. 31, 2004

(54) SYSTEM AND METHOD FOR RESTARTING OF SIGNALING ENTITIES IN H.323-BASED REALTIME COMMUNICATION NETWORKS

(75) Inventors: Markku Korpi, Starnberg (DE); Mark Clark, San Jose, CA (US); Paul Mayer, Mountain View, CA (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/296,222

(22) Filed: Apr. 22, 1999

(51) Int. Cl.[7] ............................................... H04L 12/66
(52) U.S. Cl. ........................ 370/218; 370/221; 370/401
(58) Field of Search ................................ 370/400, 401, 370/216, 217, 218, 219, 220, 221

(56) References Cited

U.S. PATENT DOCUMENTS

| 5,754,752 | A | * | 5/1998 | Sheh et al. .................... 714/4 |
| 5,848,128 | A | | 12/1998 | Frey |
| 5,974,114 | A | * | 10/1999 | Blum et al. .................... 379/9 |
| 6,088,328 | A | * | 7/2000 | McKnight .................... 370/216 |
| 6,195,705 | B1 | * | 2/2001 | Leung .......................... 370/331 |
| 6,229,804 | B1 | * | 5/2001 | Mortsolf et al. ............ 370/352 |
| 6,374,302 | B1 | * | 4/2002 | Galasso et al. ............. 370/389 |
| 6,519,249 | B1 | * | 2/2003 | Bennefeld et al. .......... 370/352 |
| 6,674,713 | B1 | * | 1/2004 | Berg et al. ................... 370/217 |

FOREIGN PATENT DOCUMENTS

| EP | 0 798 893 | | 1/1997 | |
| EP | 1 056 256 A2 | * | 11/2000 | ........... H04L/29/06 |

OTHER PUBLICATIONS

Murhammer et al. "TCP/IP Tutorial and Technical Overview". IBM International Technical Support Organization. Oct. 30th, 1998. pp. 499–504.*

Toga J., et al.: "ITU–T Standardization Activities for Interactive Multimedica Communications of Packet–Based Networks: H.323 and Related Recommendations" Computer Networks and ISDN Systems, North Holland Publishing. Amsterman, NL, vol. 31, No. 3, Feb. 11, 1999 (1999–0211), pp. 205–223, XP000700319.

Cisco Systems: Multimedia Conference Manager, Mar. 4, 1999, XP002152853.

"ITU–T Recommendation H.323. Visual Telephone Systems and Equipment for Lcal Area Networks Which Provide a Non–Guaranteed Quality of Service" ITU–T Recommendations, XX, XX, Nov. 30, 1996.

* cited by examiner

Primary Examiner—Chi Pham
Assistant Examiner—Derrick W Ferris (57) ABSTRACT

A system and method in an H.323 network for automatically reestablishing signaling that was interrupted due to gatekeeper failure. Primary and secondary gatekeepers (104a, 106a) establish a supervisory link (1b) with one another while the media connection is set up between client terminals (112a, 114a). The primary gatekeeper (104a) also establishes the H.225/H.245 signaling between the client terminals. If the primary gatekeeper (104a) fails, the H.225/H.245 connections go down, but the media connections will continue. The secondary gatekeeper (106a) than takes over the call and sends a message to its zone's clients that the H.225/H.245 connections need to be reestablished. Further, the secondary gatekeeper (106a) sends a message to the other zone's gatekeeper (if any) of what has occurred. The clients then reestablish the H.225/H.245 channel by using the original setup message with a new Reestablish parameter. The receiving client receives the message, re-establishes the signaling connection and continues using the existing media channel for the media stream of the call.

20 Claims, 10 Drawing Sheets

SYSTEM AND METHOD FOR RESTARTING OF SIGNALING ENTITIES IN H.323-BASED REALTIME COMMUNICATION NETWORKS

BACKGROUND OF THE INVENTION

The present invention relates to telecommunications systems and, particularly, to an improved system for restarting signaling entities such as an H.323 gatekeeper.

The International Telecommunications Union (ITU) H.323 standard allows building of local area network (LAN) attached communication equipment that can communicate via the Internet Protocol (IP). Typically, one or more zones are established, each zone being provided with a gatekeeper for address translation, admissions and bandwidth control, and zone management. Usually gatekeeper (GK) routed signaling is utilized. With gatekeeper routed signaling, an endpoint (e.g., client or gateway) does not send the call signaling (H.225) and media control (H.245) directly to the remote endpoint but to its gatekeeper which then sends the signaling messages to the remote endpoint via its gatekeeper. In calls over several zones and/or administrative domains, several gatekeepers are involved on the signaling path of the call.

As a result of monitoring and auditing their own operation, gatekeepers may perform a software restart, for example, as a result of detection of a software error. However, the current H.323-based (and other types of systems) LAN telephony systems do not inform the other affected entities about the restart, thereby leading to problems such as unnecessary dropping of calls and/or inconsistencies in registration of clients to gatekeepers.

For example, since the gatekeepers also initialize the TCP/IP interface during a restart, where the gatekeepers are on the signaling path, a loss of all active calls can result because of the loss of the signaling path. In particular, the TCP/IP interface initialization causes clients having active calls on the signaling path to detect an error in the TCP/IP interface. As this is a severe error, the signaling protocol stack is restarted by the local client and by the remote client, thereby resulting in a loss of all calls that were active or in progress in these endpoints. As another example, a gatekeeper restart may result in inconsistent endpoint registrations to a gatekeeper. In particular, a client that is not engaged in a call is not able to detect that its gatekeeper has failed, because in H.323 the link between endpoint and gatekeeper is not consistently supervised. If the gatekeeper failure lasts only a short time, the failure does not have any effect on the registered endpoints' operation. However, if the gatekeeper failure lasts a long time, the client must find an alternate gatekeeper in order to maintain the client's readiness to establish calls. Many current H.323 implementations perform an audit of the gatekeeper connection either autonomously by clients or via gatekeepers by periodically causing all clients to re-register with their zone's gatekeeper (e.g., H.323 RAS procedures). The re-registration thus allows the clients to detect a gatekeeper failure, perform recovery with this gatekeeper, and if recovery is unsuccessful, register with an alternate gatekeeper. However, the H.323 client terminal is not able to recover the failed connection, until the re-registration is due to take place. Typically, re-registration takes place only periodically every few minutes (because more frequent re-registration may cause excessive load on an already overloaded network) and the user must re-initiate call set-up again. As these re-registrations occur only periodically, inconsistent registrations may occur due to the time delay between re-registrations. In other implementations, a back-up gatekeeper may be provided which is continually updated so that the alternate can immediately replace the failed gatekeeper and take over the operation with IP addresses and ports as the master gatekeeper. However, this approach can be much more expensive compared to the average system cost per endpoint.

Accordingly, there is a need for an improved system and method for recovering from gatekeeper restarts.

SUMMARY OF THE INVENTION

These disadvantages in the prior art are overcome in large part by a system and method according to the present invention. In particular, a gatekeeper according to an embodiment of the invention is able to automatically recover signaling connections that were interrupted due to gatekeeper failure.

According to one embodiment, primary and secondary gatekeepers establish a supervisory link with one another while the H.323 calls and the associated H.225 signaling connections are set up between client terminals via the primary gatekeeper. The supervision is done by the secondary gatekeeper sending "keep alive" messages between gatekeepers. When the primary gatekeeper establishes a call, information about the ongoing call (i.e., calling party, called party, and other related information) is sent to the secondary gatekeeper or stored in a commonly accessible data store.

If the primary gatekeeper fails, the H.225/H.245 connections go down, but the media connections will continue. The secondary gatekeeper then initiates takeover of the call and sends to affected clients a failure notification message that primary gatekeeper has failed and the secondary gatekeeper is ready to take over and is waiting for re-registration. Further, the secondary gatekeeper sends a similar notification message of what has occurred to all other affected remote parties to the call. The clients then reestablish the H.225/H.245 channel by using the original setup message with a new Reestablish parameter. The receiving client receives the message and continues using the existing resources for the call.

A better understanding of these and other embodiments of the present invention is obtained when the following detailed description is considered in conjunction with the following drawings.

DETAILED DESCRIPTION OF THE INVENTION

Figure 1:
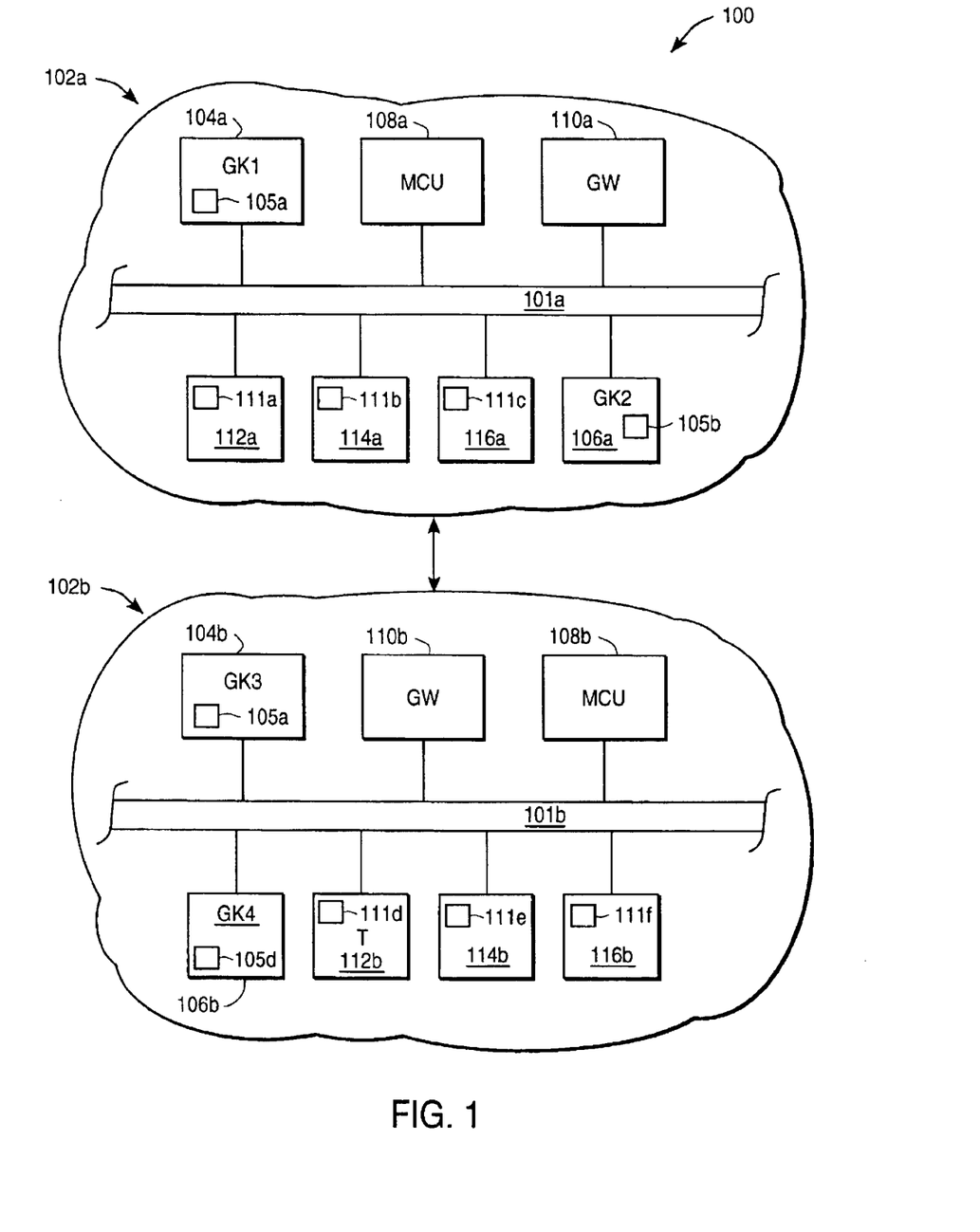
FIG. 1 is a diagram illustrating an H.323 system according to an embodiment of the invention.

FIG. 1 is a diagram illustrating an exemplary H.323 telecommunications system 100 according to an embodiment of the present invention. It is noted that, while described herein with regard to an H.323 network and restarting signaling entities like gatekeepers, the invention is equally applicable to any network in which separate media and signaling are used, such as systems using MGCP (Media Gateway Control Protocol), SIP (Simple Internet Protocol), and IETF (Internet Engineering Task Force Protocol) and to other entities such as servers (e.g., Interactive Voice Response units, proxies, etc.), gateways and other failure-proof terminals where high availability and failure recovery are needed.

As illustrated, the telecommunications system 100 includes one or more zones 102a, 102b. Each zone 102a, 102b is supervised by a primary gatekeeper 104a, 104b, respectively. Each zone further includes a secondary gatekeeper 106a, 106b, as will be described in greater detail below. In addition, each zone includes a local area network (LAN) or packet network 101a, 101b. Coupled to the LAN 101a, 101b may be a variety of H.323 terminals 112a, 114a, 116a, and 112b, 114b, 116b, respectively. Further, each zone may be provided with a multipoint control unit (MCU) 108a, 108b, and an H.323 gateway 110a, 110b, respectively. The H.323 terminals 112a, 114a, 116a, and 112b, 114b, 116b, are in compliance with the H.323 standard. Thus, the H.323 terminals 112a, 114a, 116a, and 112b, 114b, 116b support H.245 for negotiation of channel usage, Q.931 for call signaling and call setup, registration admission status (RAS), and RTP/RTCP for sequencing audio and video packets. The H.323 terminals 112a, 114a, 116a, and 112b, 114b, 116b, may further implement audio and video codecs, T.120 data conferencing protocols and MCU capabilities. Further details concerning the Recommendation H.323 may be obtained from the International Telecommunications Union (ITU); the Recommendation is hereby incorporated by reference in its entirety as if fully set forth herein. The H.323 gateways 110a, 110b interface to a switched circuit network and generally provides a translation function between H.323 conferencing endpoints in their zones and other terminal types, and performs call setup and clearing on both the LAN side and switched circuit network side.

The primary and secondary gatekeepers 104a, 104b, 106a, 106b include restart control units 105a, 105b, 105c, 105d, respectively, to permit restarts according to the present invention, as will be discussed in greater detail below. Further, the restart control units 105a, 105b, 105c, 105d permit the primary and secondary gatekeepers to establish links between one another, as will be described in greater detail below. It is noted that, while illustrated as discrete units, gatekeeper functionality can be provided within another H.323 entity, such as the gateway or other network servers. Moreover, while illustrated as separate units, typically, restart control functionality is implemented in software. Further, while illustrated specifically as being within a gatekeeper, the restart control units may be implemented in any entity along the signaling path of a call. Thus, FIG. 1 is exemplary only.

Figure 2:
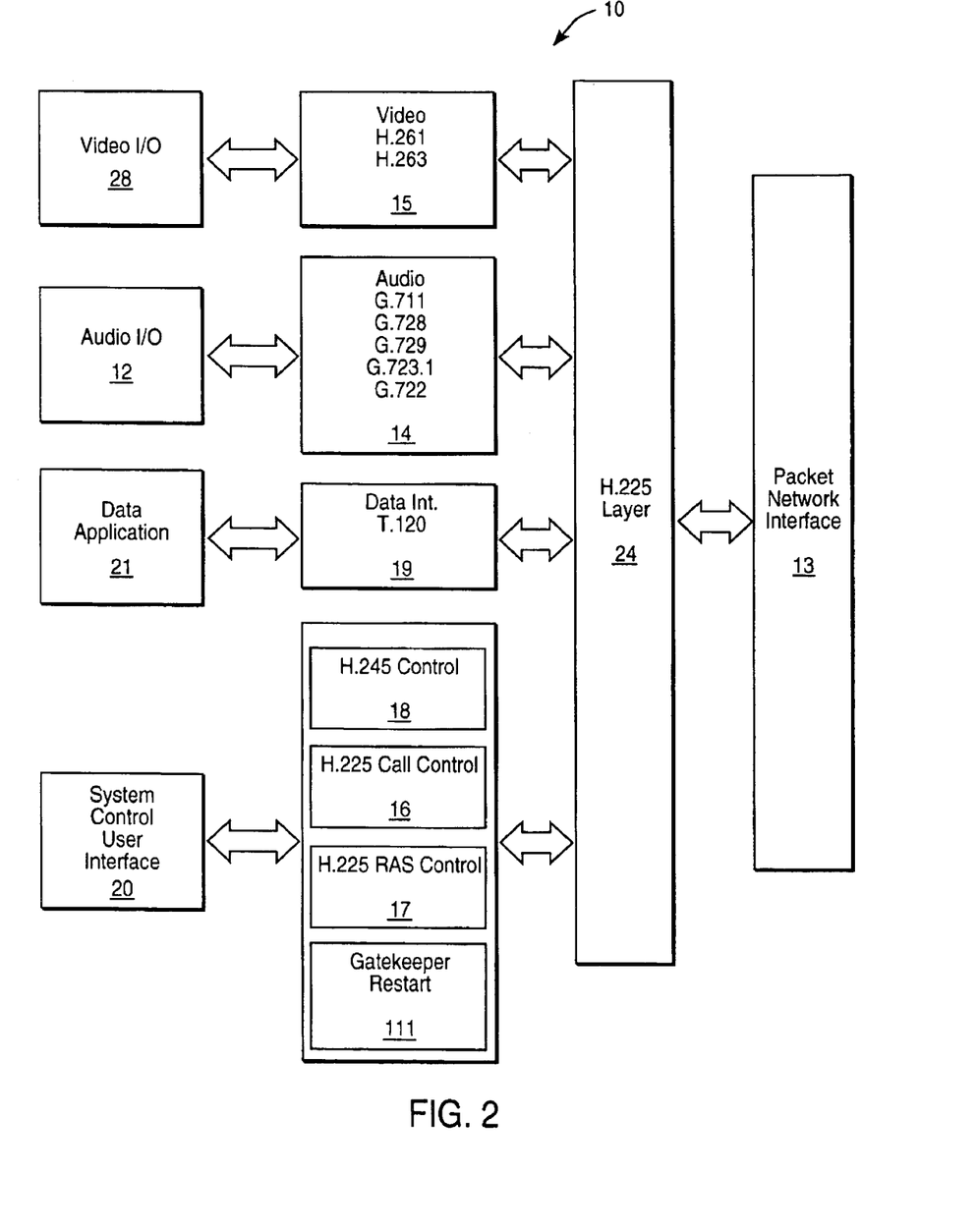
FIG. 2 is a block diagram illustrating an H.323 terminal according to an embodiment of the invention.

In accordance with a specific embodiment of the present invention, FIG. 2 illustrates a logical diagram of an H.323 interface to LAN 101. The interface includes a known network terminal/device 10 utilizing the H.323 protocol, and a packet network interface 13 that couples the H.323 device to LAN 101. H.323 terminals/devices and equipment carry real-time voice, video and/or data. It should be noted that H.323 is an umbrella recommendation that sets standards for multimedia communications, including telephony-over-LAN communications. The network can include packet-switched Transmission Control Protocol/Internet Protocol (TCP/IP) and Internet Packet Exchange (IPX) over Ethernet, Fast Ethernet and Token Ring networks.

The H.323 terminal 10 is coupled to a video input/output (I/O) interface 28, an audio I/O interface 12, an user application interface 19 coupled to an application 21, and a system control user interface (SCUI) 20. H.323 terminal 10 also includes an H.225 layer 24, a video coder/decoder (codec) 15, an audio codec 14, and a control layer 11 that includes H.245 protocol functionality 18, a Q.931-based protocol functionality 16 (i.e., H.225 call control functionality), and H.225 RAS control functionality 17, and gatekeeper restart functionality 111.

As seen in FIG. 2, video I/O interface 28 which may be part of the standard H.323 device, connects to the video coder/decoder (codec) 15 such as an H.261 codec for encoding and decoding video signals. Coupled between video I/O interface 28 and H.225 layer 24, video codec 15 translates encoded video signals to H.225 protocol signals. Although the H.261 codec can be the video codec used for an H.323 terminal, other video codecs, such as H.263 codecs and others, may also be used for encoding and decoding video.

Audio I/O interface 12, which may be part of a standard H.323 terminal, connects to the audio codec 14, such as a G.711 codec, for encoding and decoding audio signals. Coupled to audio I/O interface 12, audio codec 14 is coupled to H.225 layer 24 and translates audio signals to H.225 protocol signals. Although the G.711 codec is the mandatory audio codec for an H.323 terminal, other audio codecs, such as G.728, G.729, G.723.1, G.722, MPEG1 etc. may also be used for encoding and decoding speech. G.723.1 is a preferred codec because of its reasonably low bit rate, which enables preservation of link bandwidth, particularly in slower speed network connections. As is known, when communicating, H.323 terminals use a common coding algorithm or codec supported by all entities to the conversation/conference. This information is exchanged during an H.245 capability exchange phase.

SCUI 20 provides signaling and flow control for proper operation of the H.323 terminal. In particular, all non-audio and non-video control signaling is handled by SCUI 20. Coupled to SCUI 20 are H.245 layer 18, Q.931 layer 16 and RAS layer 32, which each couples to H.225 layer 24. Thus, SCUI 20 interfaces to the H.245 standard which is the media control protocol that allows capability exchange, channel negotiation, switching of media modes and other miscellaneous commands and indications for multimedia communications. SCUI 20 also interfaces to the Q.931 protocol which defines the setup, teardown, and control of H.323 communication sessions. SCUI 20 further interfaces to the Registration, Admission, Status (RAS) protocol that defines how H.323 entities can access H.323 gatekeepers to perform among other things address translation, thereby allowing H.323 endpoints to locate other H.323 endpoints via an H.323 gatekeeper. The H.225 standard layer 24, which is derived from the Q.931 standard, is the protocol for establishing connection between two or more H.323 terminals and also formats the transmitted video, audio, data and control streams into messages for output to the network interface 13 (e.g., transport over IP network 101). The H.225 layer 24 also retrieves the received video, audio, data and control streams from messages that have been input from network interface 13. User application interface 19, which may be a T.120 protocol interface as well as other types of protocol interfaces, also couples to H.225 layer 24.

In addition, according to the present invention, the H.323 terminal's control layer 11 may include a gatekeeper restart unit 111 which is used to communicate communication re-establishment signals, as will be described in greater detail below. The gatekeeper restart unit 111 is configured to maintain a media connection when the signaling connection has failed. As will be discussed in greater detail below, the gatekeeper restart unit 111 is configured to receive a signal from a secondary gatekeeper advising it of the failure of the primary gatekeeper, and to transmit a re-establishment set-up message to the secondary gatekeeper, while maintaining the media connection.

Thus, an H.323 network may be configured to include several different devices. For example, the network may include a terminal for enabling users connected to a LAN to speak, a terminal for enabling a caller resident on the LAN to call a second user through the public switched network and/or a terminal for enabling the adapter to communicate through a wireless trunk, using a wireless telephone. The device may also implement supplementary services according to the H.450 protocol specification.

Figure 3:
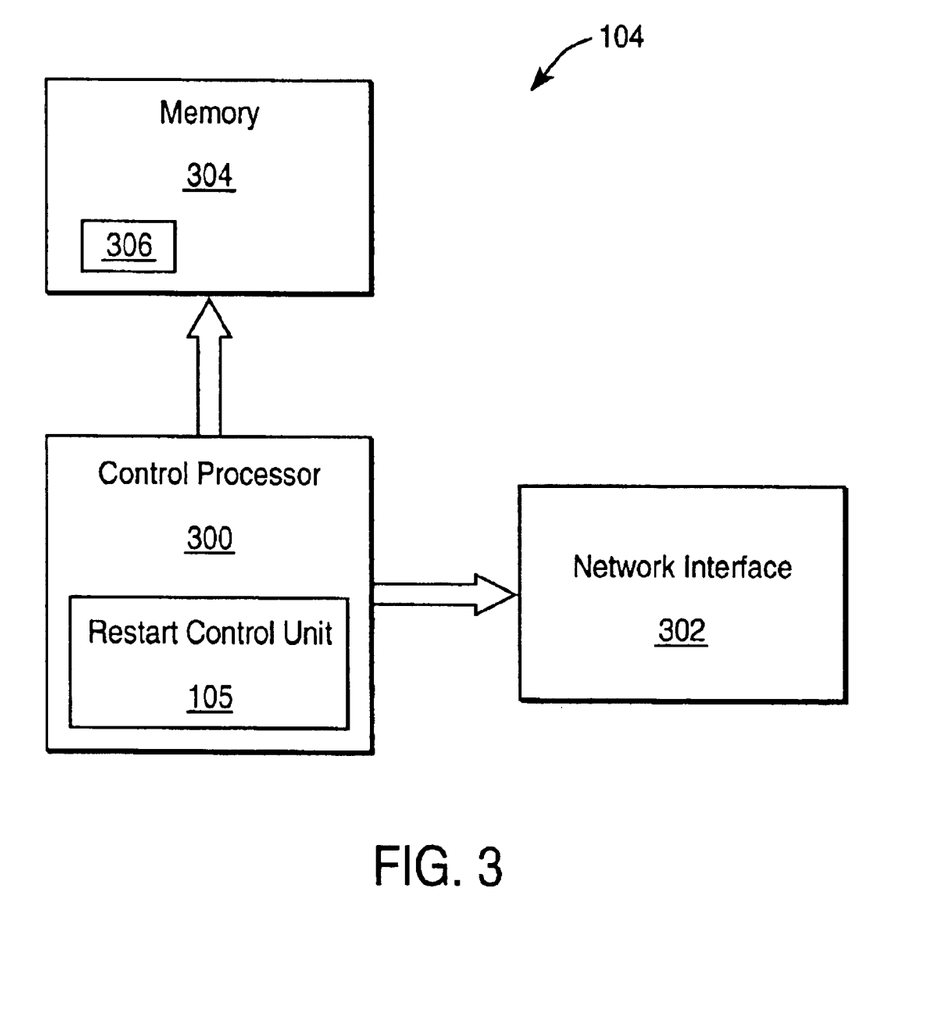
FIG. 3 is a block diagram illustrating a gatekeeper according to an embodiment of the invention.

An exemplary gatekeeper 104 according to an embodiment of the invention is shown in FIG. 3. As is known, the H.323 gatekeeper 104 performs address translation from LAN aliases for terminals and gateways to IP or IPX addresses (as defined in the RAS specification) as well as bandwidth management (also specified within the RAS specification). The H.323 gatekeeper 104 is further used for call routing. The H.323 gatekeeper 104 thus includes a network interface 302, a control processor 300 and a memory 304. The control processor 300 includes a restart control unit 105 according to the present invention. As will be described in greater detail below, the restart control unit 105 according to the present invention is configured to provide communication with primary and/or secondary gatekeepers and supervise call reestablishment if the primary gatekeeper fails. The memory 304 may be used to store call data information 306, as will be discussed in greater detail below.

Figure 4:
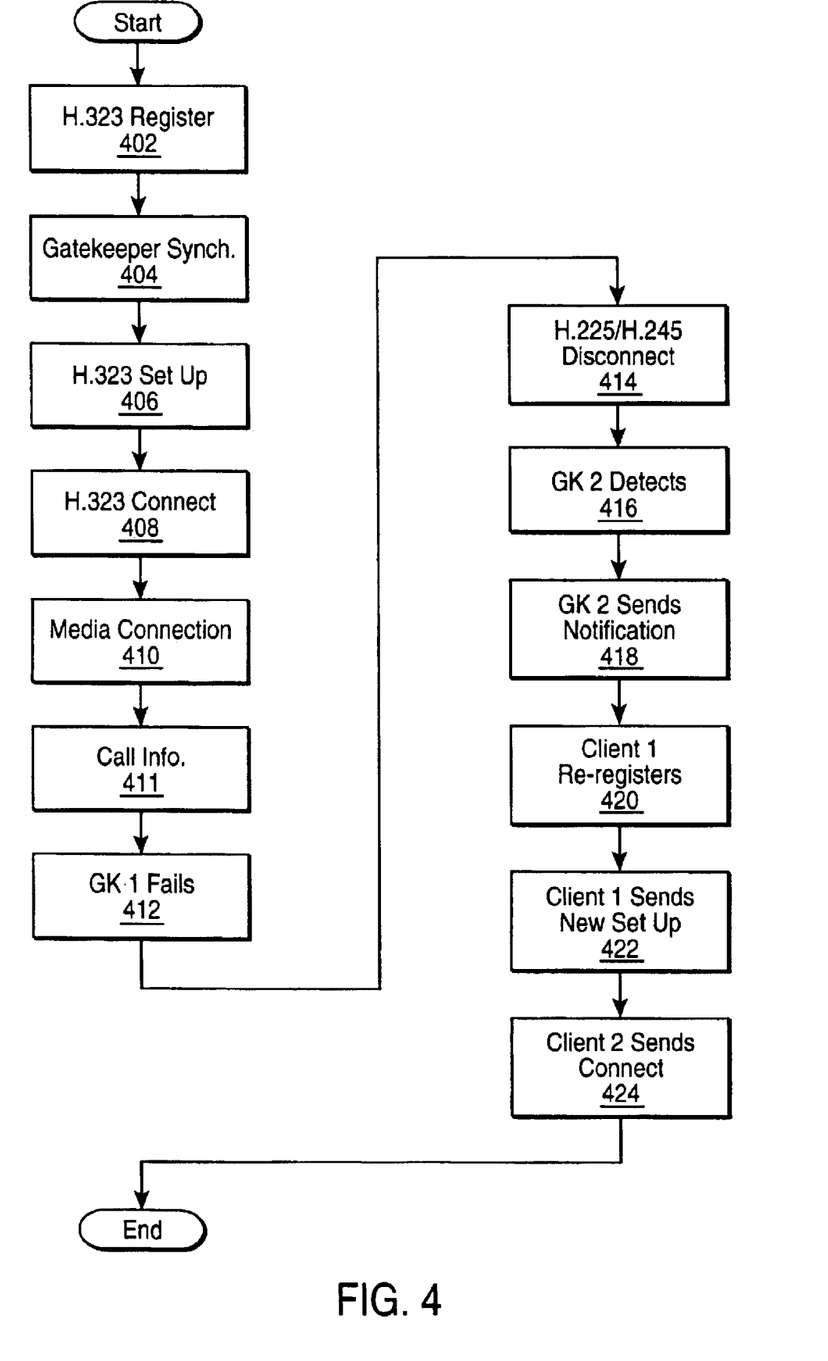
FIG. 4 is a flowchart illustrating system operation according to an embodiment of the invention.
Figure 5A:
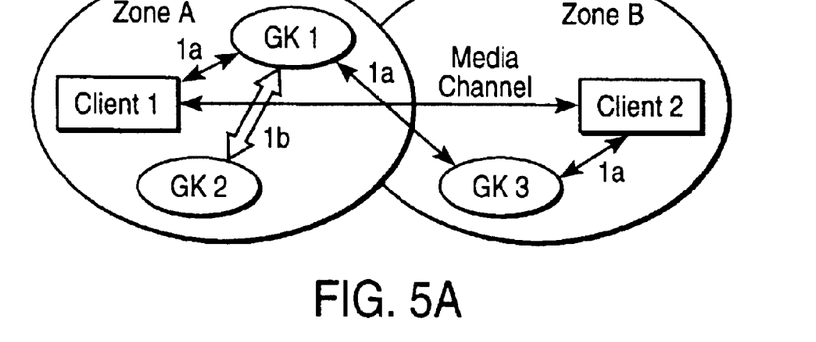
FIGS. 5A–5C illustrate operation of the embodiment of the invention shown in FIG. 4.
Figure 5B:
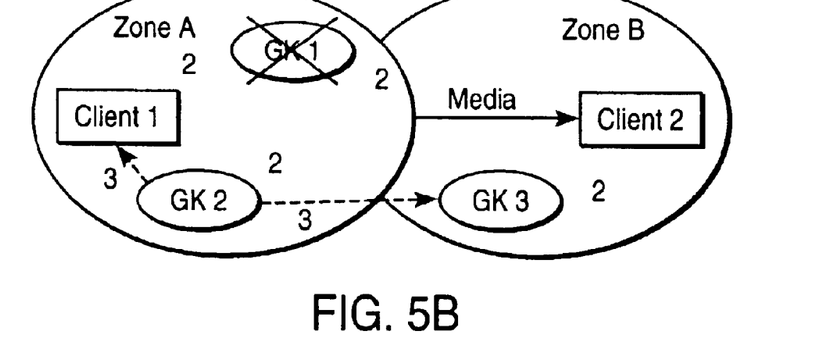
Figure 5C:
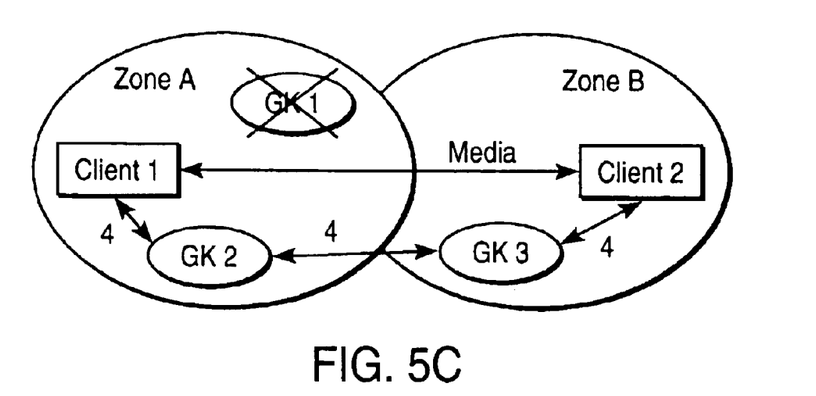
Figure 6A:
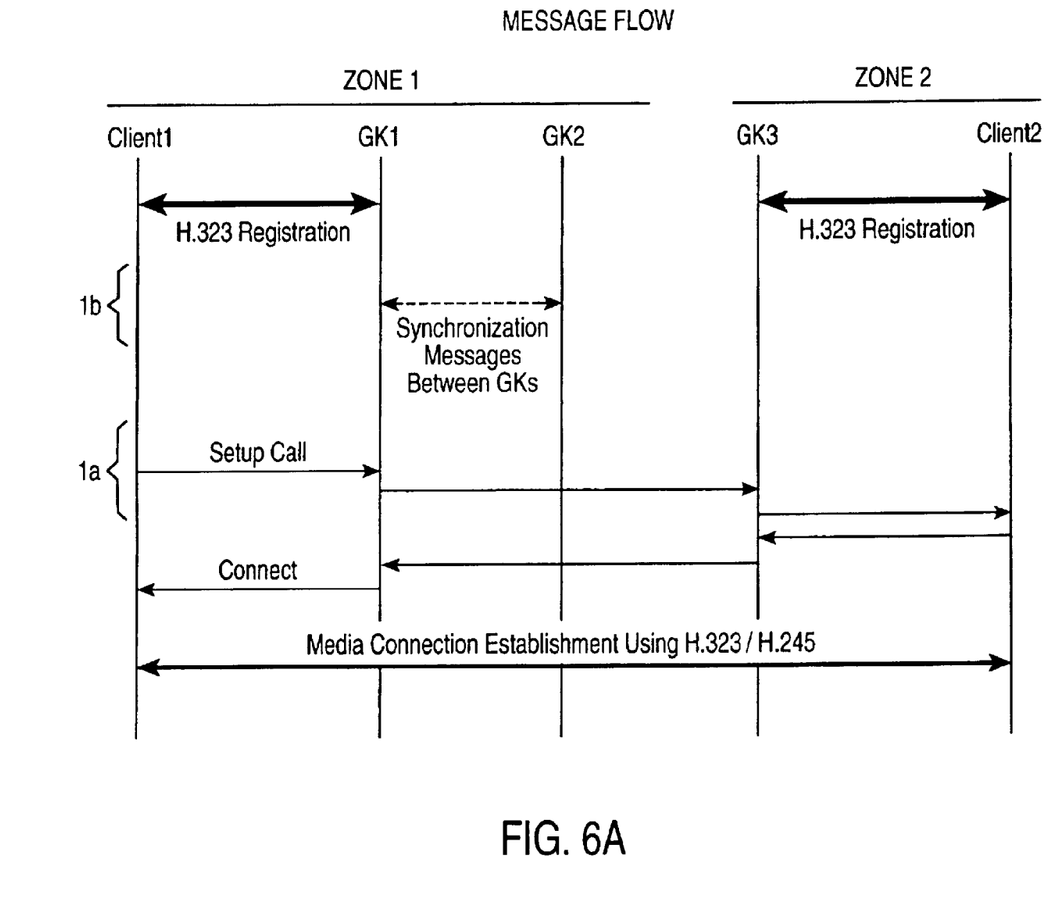
FIGS. 6A–6C illustrate message flow for the embodiment of FIGS. 5A–5C.
Figure 6B:
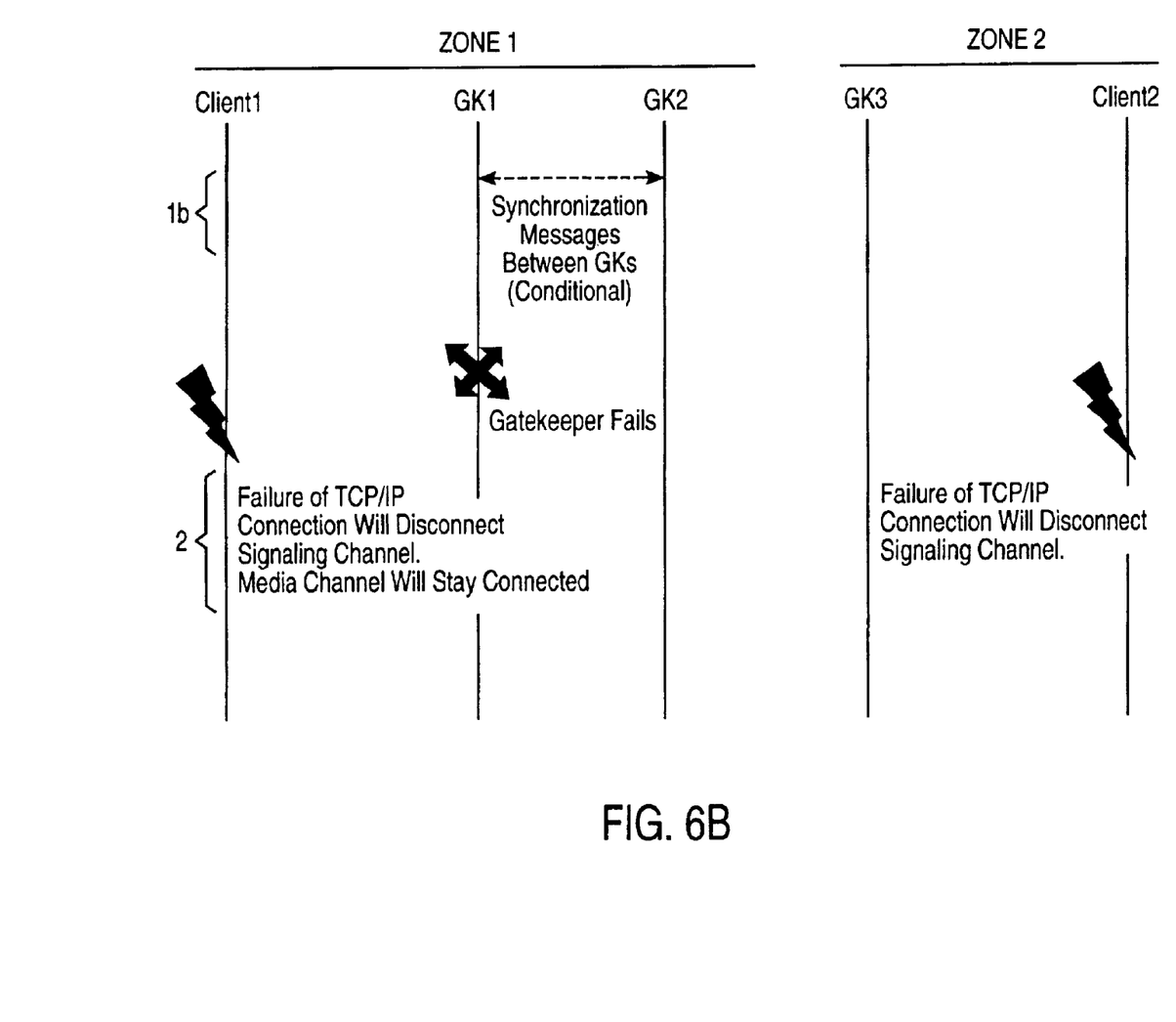
Figure 6C:
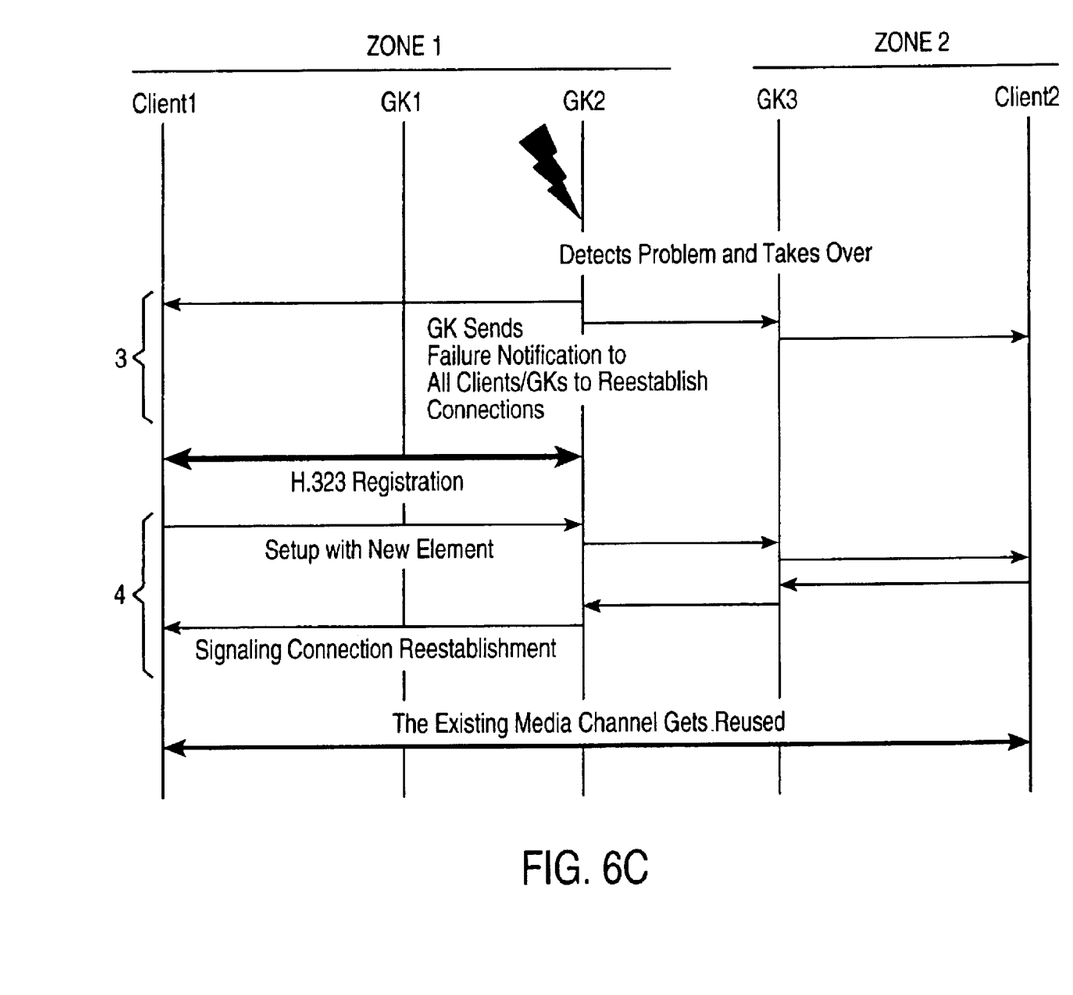
Figure 7:
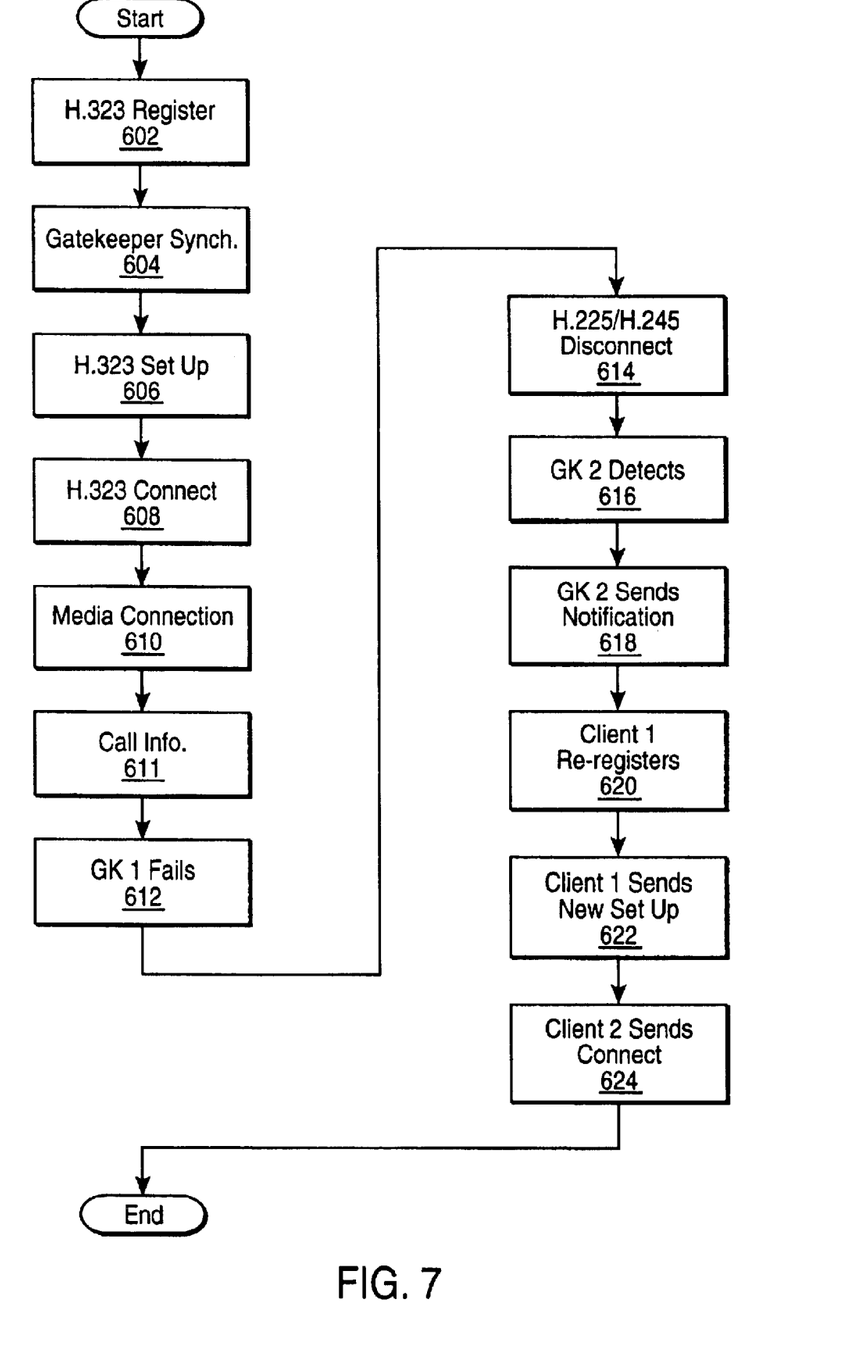
FIG. 7 is a flowchart illustrating system operation according to an embodiment of the invention.

Operation of one embodiment of the present invention may be understood with reference to the flowchart of FIG. 4, the schematics of FIGS. 5A–5C and the message flow diagrams of FIGS. 6A–6C. FIG. 5A shows a communications network including two zones, Zone A and Zone B. Zone A is served by a gatekeeper GK 1 and an alternate gatekeeper GK 2. An H.323 client Client 1 is also provided in Zone A. Zone B includes a gatekeeper GK 3 and a client Client 2.

As part of an initialization procedure, in a step 402, Client 1 registers with the gatekeeper GK 1 and Client 2 registers with gatekeeper GK 3 (FIGS. 5A and 6A). In addition, in a step 404, the gatekeepers GK 1 and GK 2 exchange supervisory/synchronization messages (1b of FIG. 5A; FIG. 6A), via their respective restart control units 105, so that the gatekeeper GK 2 can monitor if the gatekeeper GK 1 fails. In particular, a keep-alive message may be sent by the secondary gatekeeper (GK 2) to the primary gatekeeper (GK 1) which responds with a confirmation message. Every time a new call is set up, a call data synchronization message is sent to the secondary gatekeeper GK 2 (and stored, e.g., in memory 304) or stored in a commonly accessible data store (not shown). This data contains all information about the outgoing call (i.e., calling party, called party, aliases, transport addresses and other related information).

The H.323 call is setup in a step 406 (FIG. 4) using standard H.323 call setup procedures (1a of FIG. 5; FIG. 6A). In particular, Client 1 initiates a call using standard H.323 call set-up procedures with the gatekeeper GK 1. In turn, the gatekeeper GK 1 provides the call setup message to the gatekeeper GK 3 of Zone 2 (FIGS. 5A, 6A). The gatekeeper GK 3 then provides the call setup signaling to Client 2. In a step 406, Client 2 sends a call connect message to the gatekeeper GK 3. The gatekeeper GK 3, in turn, provides this message to the gatekeeper GK 1. The gatekeeper GK 1 then provides in step 408 the call connect message to the Client 1, which originated the call setup request. This signaling via the gatekeepers GK 1 and GK 3 is standard H.225/H.245 signaling. Thus, for example, the signaling includes terminal capability, bit rate, data format, and similar information. Next, in a step 410, the media connection 2000 (see FIGS. 5A, 6A), i.e., the audio/video stream, is established between Client 1 and Client 2, though call setup, and control signaling remains routed through the gatekeepers GK 1 and GK 3 (FIGS. 5A, 6A).

In addition, through the supervisory/synchronization link (1b of FIG. 5A) that was established between the gatekeepers GK 1 and GK 2 in step 404, the gatekeepers GK 1 and GK 2 may exchange information concerning calls in progress, via their restart control units 105, in a step 411. Again, this call data synchronization message information may include sending and receiving parties, terminal capabilities, data formats, and the like, and may be stored in a commonly accessible memory. Alternatively, to save bandwidth, this call synchronization information may simply be a timer tick pulse from the gatekeeper GK 1 to the gatekeeper GK 2.

Next, in a step 412 (FIGS. 5B, 6B), the gatekeeper GK 1 goes down. This causes the H.225/H.245 signaling and call setup connections to disconnect (indicated by 2 in FIG. 5B; FIG. 6B), in a step 414. However, the media connection between Client 1 and Client 2 is maintained (see FIGS. 5B, 6B).

In a step 416, the gatekeeper GK 2 detects that the gatekeeper GK 1 has crashed (FIGS. 5B, 6C). For example, the restart control unit 105 of the gatekeeper GK 2 may detect the absence of a timer tick or synchronization signal provided from the restart control unit 105 of the gatekeeper GK 1. Detection of the absence of the timer tick signal indicates to the gatekeeper GK 2 that it must now function as the zone's primary gatekeeper.

Accordingly, in a step 418, the gatekeeper GK 2 (and, in particular, the restart control unit 105) sends a gatekeeper failure notification message (3 in FIG. 5B; FIG. 6C) to Client 1 via the UDP/RAS channel to indicate that the H.225/H.245 signaling for all ongoing calls needs to be re-established. Similar information is provided (3 in FIG. 5B) to the gatekeeper GK 3 for relaying on to the Client 2. In addition, the gatekeeper GK 2 sends a message to the gatekeeper GK 3 to allow preparation of special handling for Call Detailed Routing information and Bandwidth reservation if needed. This message contains the same call information as the message sent to the affected client, except an additional parameter telling the client to wait for re-establishment.

Receiving this signal causes the Client 1 to re-register in Zone 1 with the gatekeeper GK 1, in a step 420. Next, in a step 422, Client 1 attempts to re-establish the H.225/H.245 connection (4 in FIG. 5C) by sending a modified version of the original H.323 call setup message. More particularly, an additional parameter, termed "SignalingConnectionReestablishmentInvoke," is sent (see 4 in FIG. 5C) to the gatekeeper GK 2. The new parameter indicates to the gatekeeper GK 2 that the connection is a replacement of signaling connections of an existing call between the Client 1 and Client 2. The gatekeeper GK 2 communicates (4 in FIG. 5C; FIG. 6C) with the gatekeeper GK 3 to re-establish the link with Client 2. Client 2 and, in particular, the gatekeeper restart module 111, accepts the call setup information with the new parameter and continues using the same resources for the call. In a step 424, Client 2's gatekeeper restart unit 111 sends a connect message with an additional parameter, termed "SignalingConnectionReestablishmentConfirmation," to the gatekeeper GK 3 as confirmation for a successful reestablishment of the call signaling connection. The gatekeeper GK 3 then provides the call connect message to the gatekeeper GK 2 which in turn provides it back to the Client 1. The existing media channel between Client 1 and Client 2 is unaffected by the signaling connection changes, and gets reused for the media stream of the call.

Figure 8A:
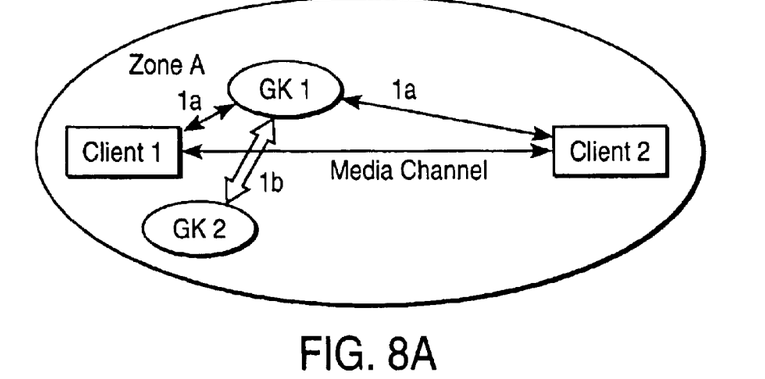
FIGS. 8A–8C illustrate operation of the embodiment of the invention shown in FIG. 7.
Figure 8B:
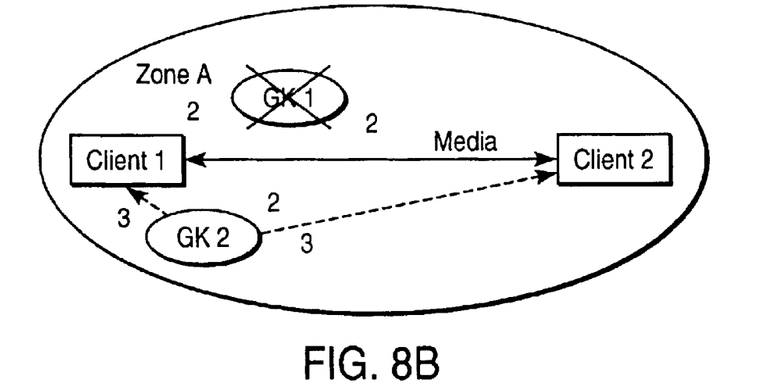
Figure 8C:
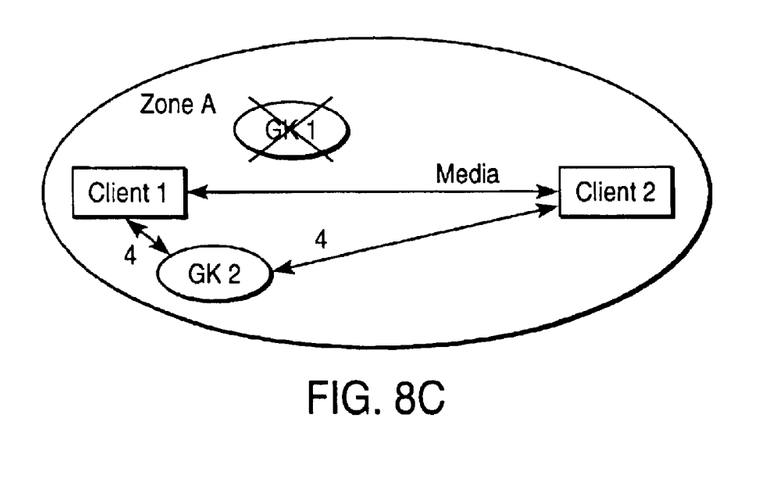

With reference to FIG. 7 and FIGS. 8A–8C, a similar procedure is used if the connection is within a single zone (Zone A), and only one primary gatekeeper GK 1 is involved (i.e., Client 1 and Client 2 are within the zone A), in accordance with another specific embodiment. Client 1 and Client 2 register with the gatekeeper GK 1 in a step 602. The gatekeeper GK 1 and the gatekeeper GK 2 then exchange a synchronization or supervisory messaging (1b of FIG. 8A), via their restart control units 105, so that the gatekeeper GK 2 can monitor if the gatekeeper GK 1 fails (FIG. 8A). As discussed above, this can include a timer tick or confirmation messaging.

Client 1 initiates a call using H.323 call set-up procedures with the gatekeeper GK 1, in a step 606. As noted above, these connections (1a in FIG. 8A) are standard H.225/H.245 connections which are set up between Client 1 and Client 2 via the gatekeeper GK 1. Thus, for example, Client 1 sends information concerning terminal capability, media format, bit rate, and the like, to the gatekeeper GK 1, which then completes the pipeline with the Client 2. Next, in a step 608, the Client 2 sends a call connect message back to the gatekeeper GK 1. The gatekeeper GK 1, in turn, sends this message back to the Client 1. In a step 610, the media connection 2002, i.e., the audio/video stream, (see FIG. 8A) is established between Client 1 and Client 2, though call setup and control signaling remains routed through the gatekeeper GK 1. In a step 611, the gatekeepers GK 1 and GK 2 maintain their supervisory link so that the gatekeeper GK 2 may determine if the gatekeeper GK 1 stops operation. In particular, the gatekeeper GK 1 may share information about ongoing calls. Next, in a step 612 (FIG. 8B), the gatekeeper GK 1 goes down. This causes the H.225/H.245 signaling and call setup connections (reference 2 in FIG. 8B) to fail, in a step 614. However, the media connection between Client 1 and Client 2 is maintained. In a step 616, the gatekeeper GK 2 detects that the gatekeeper GK 1 has crashed, for example, by detecting the absence of an ongoing timer tick signal from the gatekeeper GK 1. Then, in a step 618, the gatekeeper GK 2 sends via the UDP/RAS channel to Client 1 a gatekeeper failure notification message (3 in FIG. 8B) to indicate that the H.225/H.245 signaling for all ongoing calls needs to be re-established. In addition, the gatekeeper GK 2 sends to Client 2 a similar message (3 in FIG. 8B) with an additional parameter telling the client to be aware that the connection is to be re-established. Client 2 may activate a timer. If the call is not re-established in a predetermined period, the Client 2 releases the call.

Receiving this signal causes the Client 1 to re-register with the gatekeeper GK 2, in a step 620. Next, in a step 622, Client 1 attempts to re-establish the H.225/H.245 connection by sending a modified version of the original H.323 call setup message. More particularly, an additional parameter, termed "SignalingConnectionReestablishmentInvoke," is sent (4 in FIG. 8C) to the gatekeeper GK 2. The new parameter indicates to the gatekeeper GK 2 that the connection is a replacement of signaling connections of an existing call between the Client 1 and Client 2. The gatekeeper GK 2 communicates (4 in FIG. 8C) to re-establish the link with Client 2. Client 2 accepts the call setup information with the new parameter and continues using the same resources for the call. In a step 624, Client 2 sends a connect message with an additional parameter, termed "SignalingConnectionReestablishmentConfirmation," to the gatekeeper GK 2 as confirmation for a successful reestablishment of the call signaling connection. The gatekeeper GK 2 in turn provides it back to the Client 1, and the signaling link is re-established.

Therefore, the present invention enables the gatekeepers to perform error recovery while the active calls are protected against being disconnected. Moreover, the present invention advantageously allows calls that were being established as a restart is taking place to be automatically and quickly re-established without user intervention.

What is claimed is:

1. A telecommunications system, comprising:
   one or more clients coupled to a packet-switched network;
   a first gatekeeper coupled to said packet switched network and configured to provide for call set up and call signaling of a media connection among said one or more clients;
   a second gatekeeper, responsive to a request from at least one of said one or more clients upon notification of a failure of said first gatekeeper, configured to provide said call set up and call signaling during said communication if said first gatekeeper fails, wherein said second gatekeeper and said first gatekeeper maintain a supervisory link identifying one or more calls being supervised by said first gatekeeper prior to said failure of said first gatekeeper;
   wherein a media connection among said one or more clients is maintained while said second gatekeeper re-establishes said call set up and call signaling using information provided over said supervisory link;
   wherein said request comprises at least a portion of an original call setup request and a re-establishment identification.

2. A telecommunications system, in accordance with claim 1, said first and second gatekeepers being substantially H.323 compliant.

3. A telecommunications system in accordance with claim 2, wherein said second gatekeeper is configured to identify when said first gatekeeper has failed.

4. A telecommunications system in accordance with claim 3, said second gatekeeper configured to notify said one or more clients involved in said communication that said first gatekeeper has failed.

5. A telecommunications system including a plurality of gatekeepers and a plurality of client terminals, comprising:
   a restart unit in said plurality of clients, said restart unit configured to provide for call setup to one of said plurality of gatekeepers if another of said plurality of gatekeepers fails; and
   a restart control unit in said one of said plurality of gatekeepers, said restart control unit configured to monitor said another of said plurality of gatekeepers for failure and notify said plurality of clients of said failure;

wherein said restart unit is adapted to transmit a re-establishment request to said one of said plurality of gatekeepers, said re-establishment request including an original call setup parameter and a re-establishment identification.

6. A telecommunications system according to claim 5, said re-start control unit configured to supervise take-over of a signaling connection.

7. A telecommunications system according to claim 6, said restart units configured to re-initiate said communication via said one of said plurality of gatekeepers if said other of said plurality of gatekeepers fails.

8. A telecommunications device, comprising:
means for monitoring operation of a call signaling and set up unit, said monitoring means including means for maintaining a supervisory link with said call signaling and set up unit for identifying calls;
means for informing client terminals of a failure of said call signaling and set up unit;
said informing means including means for responding to a request for reestablishment of call signaling and set up in the event of a failure of said call signaling and set up unit;
means for providing said call signaling and call set up in the event of a failure of said call signaling and set up unit while maintaining a media connection between a plurality of client terminals, said reestablishment request including an original call setup parameter and a re-establishment identification.

9. A telecommunications system having separate call signaling and media connections, comprising:
one or more clients;
a first control processor configured to provide for call signaling during media connections among said one or more clients;
a second control processor configured, responsive to a request from at least one of said one or more clients upon notification of a failure of said first control processor, to provide said call signaling during said connections if said first controller fails, wherein said second control processor and said first control processor maintain a supervisory link identifying one or more calls being supervised by said first control processor prior to said failure of said first control processor;
wherein said media connection among said one or more clients is maintained while said second controller re-establishes said call signaling using information provided over said supervisory link;
wherein said request comprises at least a portion of an original call setup request and a re-establishment identification.

10. A telecommunications system, in accordance with claim 9, said first and second control processors being substantially H.323 compliant.

11. A telecommunications system having separate call signaling and media connections, comprising:
one or more clients;
a first control processor configured to provide for call signaling during media connections among said one or more clients;
a second control processor configured, responsive to a request from at least one of said one or more clients upon notification of a failure of said first control processor, to provide said call signaling during said connections if said first controller fails, wherein said second control processor and said first control processor maintain a supervisory link identifying one or more calls being supervised by said first control processor prior to said failure of said first control processor;
wherein said media connection among said one or more clients is maintained while said second controller re-establishes said call signaling using information provided over said supervisory link;
wherein said second control processor is configured to identify when said first controller has failed;
wherein said request comprises an original call setup parameter and a re-establishment identification.

12. A telecommunications system, in accordance with claim 11, said second control processor configured to notify said one or more clients that said first control processor has failed.

13. A telecommunications system, in accordance with claim 12, wherein said second control processor is configured to receive call set up signaling from said one or more clients indicating that call signaling for an existing call is being re-established.

14. A method for supervising a communication between a plurality of clients in a telecommunications system having separate media and signaling channels, including a first control processor on a signaling path, comprising:
establishing a supervisory link between said first control unit and a second control unit, said supervisory link providing information concerning calls being handled by said first control unit;
detecting at said second control processor when said first control processor has failed during said communication;
re-establishing, responsive to a request from said at least one of said clients and information received over said supervisory link, said signaling path via said second control processor while maintaining a media communication between said plurality of clients;
wherein said request comprises original call setup request information and a re-establishment identification.

15. A method for supervising a communication between a plurality of clients in a telecommunications system having separate media and signaling channels, including a first control processor on a signaling path, comprising:
establishing a supervisory link between said first control processor and a second control processor, said supervisory link providing information concerning calls being handled by said first control unit;
detecting at said second control processor when said first control processor has failed during said communication;
re-establishing, responsive to a request from said at least one of said clients and information received over said supervisory link, said signaling path via said second control processor while maintaining a media communication between said plurality of clients;
said re-establishing comprising said second control processor sending a signal to a first of said plurality of clients;
wherein said request comprises original call setup request information and a re-establishment identification.

16. A method according to claim 15, said re-establishing comprising said first of a plurality of clients transmitting to said second control processor call set-up information related to said ongoing media communication.

17. A method according to claim 16, said re-establishing comprising said second control processor relaying a re-establish message to a second of said plurality of clients responsive to receipt of said call set-up information.

18. A telecommunications system, comprising:

one or more clients coupled to a packet-switched network;

a first gatekeeper coupled to said packet switched network and configured to provide for call set up and call signaling of a media connection among said one or more clients;

a second gatekeeper, responsive to a request from at least one of said one or more clients upon notification of a failure of said first gatekeeper, configured to provide said call set up and call signaling during said communication if said first gatekeeper fails, wherein said second gatekeeper and said first gatekeeper maintain a supervisory link identifying one or more calls being supervised by said first gatekeeper prior to said failure of said first gatekeeper;

wherein a media connection among said one or more clients is maintained while said second gatekeeper re-establishes said call set up and call signaling using information provided over said supervisory link;

wherein said request comprises original call setup request information and a re-establishment identification.

19. A method for supervising a communication between a plurality of clients in a telecommunications system having separate media and signaling channels, including a first control processor on a signaling path, comprising:

establishing a supervisory link between said first control unit and a second control unit, said supervisory link providing information concerning calls being handled by said first control unit;

detecting at said second control processor when said first control processor has failed during said communication;

re-establishing, responsive to a request from said at least one of said clients and information received over said supervisory link, said signaling path via said second control processor while maintaining a media communication between said plurality of clients;

wherein said request comprises original call setup request information and a re-establishment identification.

20. A telecommunications system including a plurality of gatekeepers and a plurality of client terminals, comprising:

a restart unit in said plurality of clients, said restart unit configured to provide for call setup to one of said plurality of gatekeepers if another of said plurality of gatekeepers fails; and a restart control unit in said one of said plurality of gatekeepers, said restart control unit configured to monitor said another of said plurality of gatekeepers for failure and notify said plurality of clients of said failure;

wherein said restart unit is adapted to transmit a re-establishment request to said one of said plurality of gatekeepers, said re-establishment request including an original call setup parameter and a re-establishment identification.

* * * * *